United States Patent
Im et al.

(10) Patent No.: US 9,258,079 B2
(45) Date of Patent: Feb. 9, 2016

(54) APPARATUS AND METHOD FOR GENERATING SOFT-DECISION INFORMATION IN A MULTIPLE ANTENNA SYSTEM

(71) Applicant: Samsung Electronics Co., Ltd., Suwon-si, Gyeonggi-do (KR)

(72) Inventors: Tae-Ho Im, Yongin-si (KR); Kyung-Whoon Cheun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 4 days.

(21) Appl. No.: 14/160,936

(22) Filed: Jan. 22, 2014

(65) Prior Publication Data

US 2014/0205043 A1 Jul. 24, 2014

(30) Foreign Application Priority Data

Jan. 18, 2013 (KR) .................. 10-2013-0005663

(51) Int. Cl.
*H04L 27/06* (2006.01)
*H04L 1/00* (2006.01)

(52) U.S. Cl.
CPC ........................ *H04L 1/00* (2013.01)

(58) Field of Classification Search
CPC .............. H04L 25/067; H04L 2025/03426; H04L 25/03318; H04L 25/03242; H04L 25/03171; H04L 27/38; H04B 7/0854

USPC .......................................... 375/341
See application file for complete search history.

(56) References Cited

U.S. PATENT DOCUMENTS

| | | | |
|---|---|---|---|
| 2007/0116143 A1 | 5/2007 | Bjerke et al. | |
| 2007/0280335 A1* | 12/2007 | Kim et al. ............... | 375/147 |
| 2008/0232500 A1 | 9/2008 | Oh et al. | |
| 2008/0279298 A1* | 11/2008 | Ben-Yishai et al. ....... | 375/261 |
| 2008/0279299 A1* | 11/2008 | Reuven et al. ............ | 375/267 |
| 2009/0116590 A1 | 5/2009 | Lee et al. | |
| 2011/0051861 A1* | 3/2011 | Yang ...................... | 375/341 |
| 2011/0188615 A1* | 8/2011 | Yang et al. .............. | 375/341 |

* cited by examiner

*Primary Examiner* — Shuwang Liu
*Assistant Examiner* — David S Huang
(74) *Attorney, Agent, or Firm* — Jefferson IP Law, LLP

(57) ABSTRACT

A method and an apparatus for generating soft-decision information in a multiple antenna system are provided. The method includes determining Q candidate symbol vectors for a first transmission symbol of a received signal vector by performing parallel detection on a received signal vector and a channel matrix, determining a candidate symbol vector having a shortest Euclidean distance to the received signal vector from among the Q candidate symbol vector, as an approximate Maximum Likelihood (ML) symbol vector, determining (Q−1) candidate symbol vectors for each of the remaining transmission symbols of the received signal vector by performing partial parallel detection on the received signal vector and the channel matrix using the approximate ML symbol vector, and calculating Log Likelihood Ratios (LLRs) of bits of the first transmission symbol using the candidate symbol vectors, wherein Q represents a modulation order.

14 Claims, 8 Drawing Sheets

| FER | Modulation | SOSD | LSD | QRD-M | EMBODIMENT OF PRESENT DISCLOSURE |
|---|---|---|---|---|---|
| $10^{-1}$ | QPSK | 95 | 130 | 84 | 52 |
| | 16-QAM | 1,140 | 1,000 | 1,296 | 244 |
| | 64-QAM | 20,700 | 3,850 | 16,448 | 1,012 |
| $10^{-2}$ | QPSK | 94 | 118 | 84 | 52 |
| | 16-QAM | 1,130 | 650 | 1,296 | 244 |
| | 64-QAM | 20,810 | 2,127 | 16,448 | 1,012 |

APPARATUS AND METHOD FOR GENERATING SOFT-DECISION INFORMATION IN A MULTIPLE ANTENNA SYSTEM

CROSS-REFERENCE TO RELATED APPLICATION(S)

This application claims the benefit under 35 U.S.C. §119(a) of a Korean patent application filed on Jan. 18, 2013 in the Korean Intellectual Property Office and assigned Serial number 10-2013-0005663, the entire disclosure of which is hereby incorporated by reference.

TECHNICAL FIELD

The present disclosure relates to a multiple antenna system. More particularly, the present disclosure relates to a method and apparatus for generating soft-decision information in a multiple antenna system using coded spatial multiplexing.

BACKGROUND

In a multiple antenna system using spatial multiplexing, a transmitter may transmit different channel-coded signals simultaneously through a plurality of transmission antennas, and a receiver may receive a signal in which transmission signals carrying different information transmitted from the transmitter through the plurality of transmission antennas are combined in space. Thus, the receiver needs to separate the spatially multiplexed signals and generate soft-decision values as a channel decoder input by soft-deciding channel-coded signals. In order generate the soft-decision values, the receiver needs a plurality of candidate symbol vectors. Accordingly, the receiver needs to detect the candidate symbol vectors with minimal complexity.

According to the related art, an algorithm that detects candidate symbol vectors is Maximum Likelihood Detection (MLD). MLD offers optimum performance but is very complex. In this context, tree search-based reception algorithms having low complexity without much performance degradation relative to MLD, such as, for example, List Sphere Decoding (LSD) and QR Decomposition-M algorithm (QRD-M) have been proposed. However, even if a tree search scheme is used to detect the candidate symbol vectors, a large volume of computation is still required to achieve performance approximate to the performance of MLD. Moreover, a detection time varies depending on a channel state or a noise magnitude in LSD and a sorting algorithm is needed for tree search in QRD-M.

In most multiple antenna systems using spatial multiplexing according to the related art, a receiver calculates soft-decision values of candidate symbol vectors by max-log approximation in order to reduce computation complexity. The use of max-log approximation may simplify the design problem of a receiver that generates soft-decision values to the design problem of a receiver that generates hard-decision values. With the use of a major technique for generating hard-decision information, Sphere Detection (SD), a receiver that generates soft-decision values with the same performance and low complexity relative to MLD may be designed. Nonetheless, SD still has high complexity and a detection time varies due to computation complexity depending on a channel state or a noise magnitude.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for transmitting/receiving a signal in a multiple antenna system.

Another aspect of the present disclosure is to provide a method and apparatus for generating soft-decision values in a multiple antenna system using coded spatial multiplexing.

Another aspect of the present disclosure is to provide a method and apparatus for generating soft-decision values as a channel decoder input in a multiple antenna system using coded spatial multiplexing.

Another aspect of the present disclosure is to provide a method and apparatus for effectively selecting a plurality of candidate symbol vectors required to generate soft-decision values in a multiple antenna system.

Another aspect of the present disclosure is to provide a method and apparatus for calculating soft-decision values as a channel decoder input in such a manner that performance approximate to Maximum Likelihood Detection (MLD) is achieved, and complexity is low and a detection time is constant relative to a tree search in a multiple antenna system.

In accordance with an aspect of the present disclosure, a method for generating soft-decision information in a multiple antenna system is provided. The method includes determining Q candidate symbol vectors for a first transmission symbol of a received signal vector by performing parallel detection on a received signal vector and a channel matrix, determining a candidate symbol vector having a shortest Euclidean distance to the received signal vector from among the Q candidate symbol vector, as an approximate Maximum Likelihood (ML) symbol vector, determining (Q−1) candidate symbol vectors for each of the remaining transmission symbols of the received signal vector by performing partial parallel detection on the received signal vector and the channel matrix using the approximate ML symbol vector, and calculating Log Likelihood Ratios (LLRs) of bits of the first transmission symbol using the candidate symbol vectors, wherein Q represents a modulation order.

In accordance with another aspect of the present disclosure, an apparatus for generating soft-decision information in a multiple antenna system is provided. The apparatus includes a parallel detector configured to determine Q candidate symbol vectors for a first transmission symbol of a received signal vector by performing parallel detection on a received signal vector and a channel matrix and to determine a candidate symbol vector having a shortest Euclidean distance to the received signal vector from among the Q candidate symbol vector, as an approximate ML symbol vector, a plurality of partial parallel detectors configured to determine (Q−1) candidate symbol vectors for each of the remaining transmission symbols of the received signal vector by performing partial parallel detection on the received signal vector and the channel matrix using the approximate ML symbol vector, and a calculator configured to calculate LLRs of bits of the first transmission symbol using the candidate symbol vectors, wherein Q represents a modulation order.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
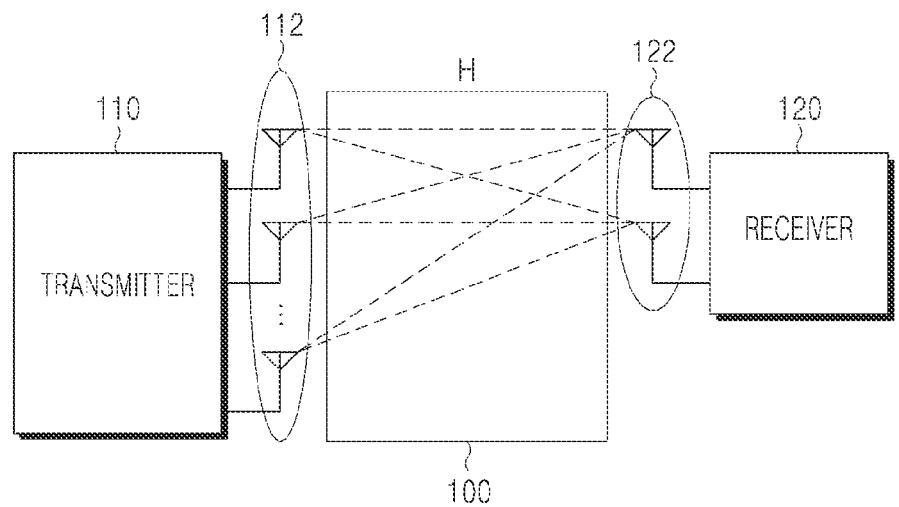
FIG. 1 is a block diagram of a multiple antenna system using spatial multiplexing according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skilled in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The following description will be given of various embodiments of the present disclosure in the context of a coded spatial multiplexing-based multiple antenna system using a binary error correction code in which soft-decision decoding is performed.

According to various embodiments of the present disclosure, an electronic device may include communication functionality. For example, an electronic device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a Digital Video Disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., Magnetic Resonance Angiography (MRA) device, a Magnetic Resonance Imaging (MRI) device, Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be a base station, a macro base station, a femto base station, a wireless router, and/or the like.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, a transmitter and/or a receiver may be implemented in an electronic device.

FIG. 1 is a block diagram of a multiple antenna system using spatial multiplexing according to an embodiment of the present disclosure.

Referring to FIG. 1, a transmitter 110 includes a plurality of Transmission (Tx) antennas 112 and transmits transmission signals through the Tx antennas 112. The Tx antennas 112 transmit signals carrying different information for one or more receivers. The transmitted signals are multiplexed spatially and experience channels H 100. The channels H 100 include channels between the Tx antennas 112 and a plurality of Reception (Rx) antennas 122.

A receiver 120 receives the spatially multiplexed signal through the plurality of Rx antennas 122. The receiver separates the multiplexed transmission signals from the received signal using a predetermined detection algorithm.

Figure 2A:
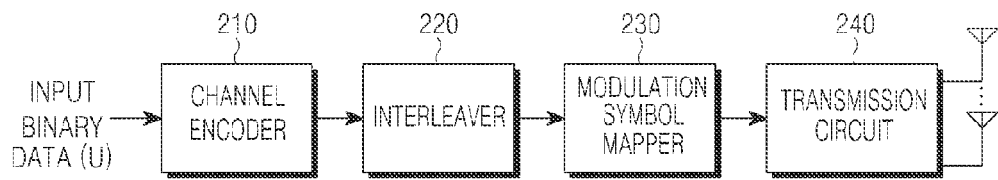
FIG. 2A is a block diagram of a transmitter in a multiple antenna system using coded spatial multiplexing according to an embodiment of the present disclosure.

FIG. 2A is a block diagram of a transmitter in a multiple antenna system using coded spatial multiplexing according to an embodiment of the present disclosure.

Referring to FIG. 2A, a transmitter may include a channel encoder 210, an interleaver 220, a modulation symbol mapper 230, and a transmission circuit 240.

The channel encoder 210 encodes input binary data u using an appropriate binary error correction code. The interleaver 220 interleaves the coded data.

The modulation symbol mapper 230 generates a transmission symbol vector $s=[s_1, \ldots, s_N]^T$ by allocating each sub-vector symbol $b=[b_{i,1}, \ldots, b_{i,Mc}]^T$ ($i=1, \ldots, N$, $b_{i,j}=\{0,1\}$) to a specific modulation symbol $s_i$ ($i=1, \ldots, N$), for each block including $NM_c$ interleaved binary code symbols $b=[b_1^T, \ldots b_N^T]^T$. Herein, N is the number of Tx antennas and $M_c$ is the number of bits per transmission symbol. For example, M-ary Quadrature Amplitude Modulation (M-QAM) such as 4-ary Quadrature Amplitude Modulation (4QAM), 16-ary QAM (16QAM), or 64-ary QAM (64QAM) may be used for the modulation symbol mapping, and each transmission symbol may be one of all possible Q modulation symbols. In addition, $a^T$ represents the transpose of a vector a and $s_i$ represents a modulation symbol transmitted through an $i^{th}$ Tx antenna.

The transmission circuit 240 loads the modulation symbols of the transmission symbol vector received from the modulation symbol mapper 230 on at least one carrier. Thereafter, the transmission circuit 240 transmits the modulation symbols through a plurality of Tx antennas. For example, the transmission circuit 240 transmits the modulation symbols in the air.

Figure 2B:
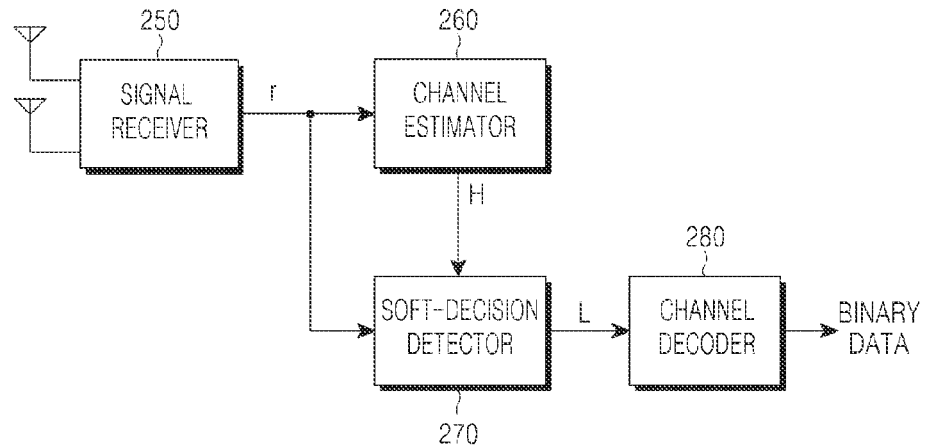
FIG. 2B is a block diagram of a receiver in a multiple antenna system using coded spatial multiplexing according to an embodiment of the present disclosure.

FIG. 2B is a block diagram of a receiver in a multiple antenna system using coded spatial multiplexing according to an embodiment of the present disclosure.

Referring to FIG. 2B, a receiver includes a signal receiver 250, a channel estimator 260, a soft-decision detector 270, and a channel decoder 280.

The signal receiver 250 provides a spatially multiplexed signal r received through a plurality of Rx antennas to the channel estimator 260 and the soft-decision detector 270. The channel estimator 260 estimates channels between a transmitter and the receiver using a Reference Signal (RS) included in the received signal and provides an estimated channel matrix H to the soft-decision detector 270. The soft-decision detector 270 calculates a soft-decision value, for example, a Log Likelihood Ratio (LLR) of each transmission binary data from the received signal r and the channel matrix H by a predetermined detection algorithm. The channel decoder 280 recovers binary data transmitted from the transmitter by channel-decoding received LLRs.

A complex baseband equivalent received signal vector r ($\in C^{N \times 1}$) may be expressed as $r=Hs+n$ on a quasi-static Rayleigh fading channel. $C^{N \times 1}$ is an N×1 vector, representing at least one of all possible modulation symbols produced in an $N^{th}$-order modulation scheme.

Herein, n ($\in C^{N \times 1}$) is an N×1 complex Gaussian noise vector with elements which are independently and identically distributed (i.i.d.) complex Gaussian probability variables with mean zero and variance per dimension $N_0/2$. The channel matrix H ($=C^{N \times N}$) is composed of elements $h_{i,j}$ which are i.i.d. complex Gaussian probability variables with mean zero and variance per dimension ½. Herein, $h_{i,j}$ represents a complex channel response between a $j^{th}$ Tx antenna and an $i^{th}$ Rx antenna. In addition, it is assumed that the channel matrix H is full-rank, known accurately to the receiver.

If binary data $b_{i,j}$ are transmitted with an equal probability, the accurate LLRs of the binary data bi,j may be calculated by the following Equation (1).

$$L(b_{i,j} \mid r, H) \cong \sum_{s \in A_{i,j}^1 \cap N} e^{-\frac{\|r-Hs\|^2}{N_0}} - \sum_{s \in A_{i,j}^0 \cap N} e^{-\frac{\|r-Hs\|^2}{N_0}} \quad \text{Equation (1)}$$

where $A_{i,j}v$ (v=0,1) is a set of all transmittable $2NM_{c-1}$ symbol vectors with $b_{i,j}$ being v, N0 is a noise variance, and N is a set of candidate symbol vectors. In Maximum Likelihood Detection (MLD), N is a set of all transmittable $2NM_{c-1}$ symbol vectors.

If max-log approximation is applied to the summation term of Equation (1), the LLR of each binary data bi,j may be calculated by the following Equation (2).

$$L(b_{i,j} \mid r, H) \approx \min_{s \in A_{ij}^0 \cap N} \left( \frac{\|r-Hs\|^2}{N_0} \right) - \min_{s \in A_{ij}^1 \cap N} \left( \frac{\|r-Hs\|^2}{N_0} \right) \quad \text{Equation (2)}$$

Figure 3:
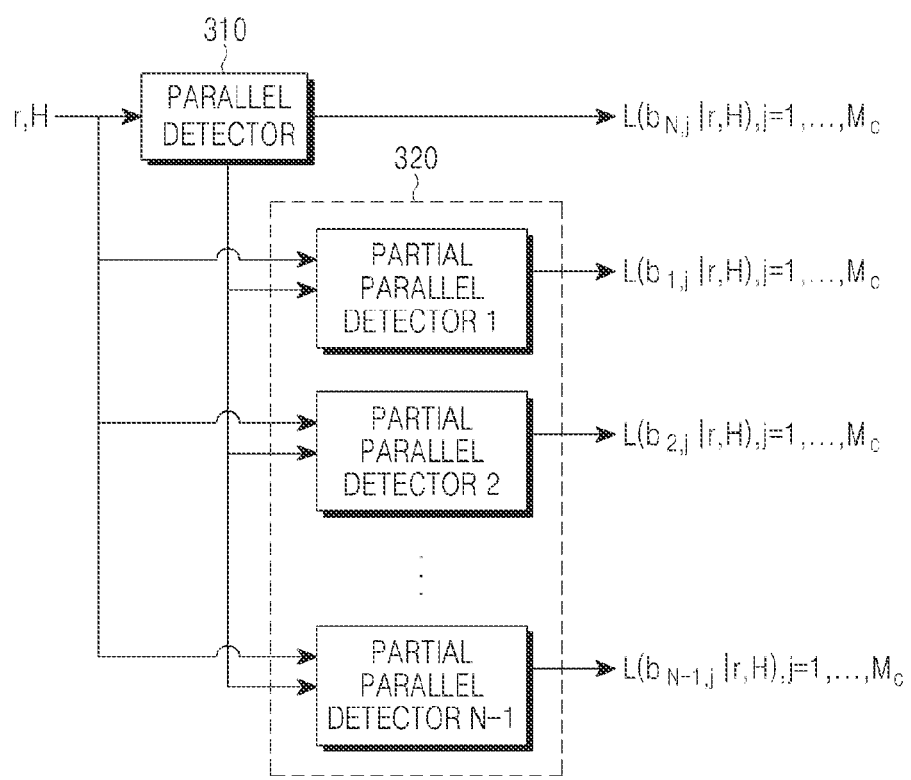
FIG. 3 is a block diagram of a soft-decision detector according to an embodiment of the present disclosure.

FIG. 3 is a block diagram of a soft-decision detector according to an embodiment of the present disclosure.

Referring to FIG. 3, a soft decision detector may include a parallel detector 310 and a partial parallel detector unit 320.

The parallel detector 310 determines LLRs of Q candidate symbol vectors for the last $s_N$ of transmission symbol vectors to be detected by performing parallel detection using a received signal vector r and a channel matrix H. Herein, Q represents the order of a modulation scheme.

The partial parallel detection unit 320 includes (N−1) partial parallel detectors that determine LLRs of candidate symbol vectors for the other transmission symbol vectors $s_1, \ldots, s_{N-1}$. An ith partial parallel detector corresponding to an ith transmission symbol vector may determine LLRs of (Q−1) candidate symbol vectors for a transmission symbol vector $s_i$ using the received signal vector r and the channel matrix H, taking into account the candidate symbol vectors detected by the parallel detector 310.

Although not shown, the LLRs of candidate symbol vectors for each transmission symbol vector are input to the channel decoder 208, for use in detecting the transmission symbol vector.

The parallel detection and partial parallel detection illustrated in FIG. 3 will be described in greater detail.

The parallel detector 310 decomposes the channel matrix H (=QR) into QR, where Q is an N×N unitary matrix, and R is an N×N upper triangular matrix with diagonal elements being real values. It is assumed herein that the channel matrix H is always ordered for all considered reception techniques. Left-multiplying the Hermitian transpose matrix QH of the unitary matrix Q by the received signal vector r gives $Y \cong Q^H r = Rs + \tilde{n}$ and $\tilde{n}$ has the same statistic characteristics as n.

If the received signal r is processed by parallel detection, Q candidate symbol vectors are generated by Decision Feedback Equalization (DFE) of all possible Q symbols that $s_N$ may have. A candidate symbol vector having the shortest Euclidean distance to the received signal r is defined as an approximate Maximum Likelihood (ML) symbol vector, denoted by $s_{app}$. A code symbol sub-vector corresponding to $s_i^{app}$ is defined as $b_i^{app}$. The LLR of $b_{N,j}$ is calculated using a candidate symbol vector having the shortest Euclidean distance to the received signal r and satisfying $b_{N,j} = \bar{b}_{N,j}^{app}$ from among the Q candidate symbol vectors. Because the Euclidean distances between the Q candidate symbol vectors and the received signal r are already calculated for selection of $s_{app}$, the LLR calculation may be performed using the Euclidean distances without re-calculating the Euclidean distances.

The partial parallel detectors of the partial parallel detection unit 320 calculate the LLRs of code symbols included in transmission symbols other than $s_N$.

For each $s_i$ ($i \neq N$), the channel matrix H is re-ordered such that the last of transmission symbol vectors becomes $s_i$ and then (Q−1) DFE operations are performed on $s_i$ for all possible values other than $s_i^{app}$. Subsequently, each of the partial parallel detectors generates the LLRs of candidate symbols included in $s_i$ using the candidate symbol vectors having the shortest Euclidean distances to the received signal r and satisfying $b_{N,j} = \bar{b}_{N,j}^{app}$ and the approximate ML symbol vector sapp, from among (Q−1) candidate symbol vectors generated by the (Q−1) DFE operations.

Figures 4, 5:
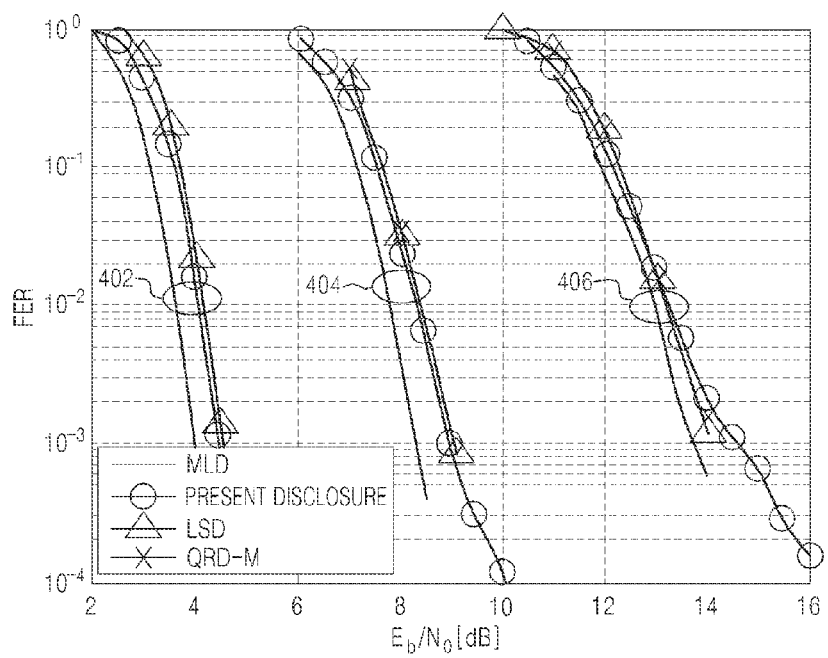
FIG. 4 is a graph illustrating simulated performance of calculating soft-decision values according to an embodiment of the present disclosure.
FIG. 5 is a table listing soft-decision detection performance for detection algorithms and modulation orders according to an embodiment of the present disclosure.

FIG. 4 is a graph illustrating simulated performance of calculating soft-decision values according to an embodiment of the present disclosure. FIG. 5 is a table listing soft-decision detection performance for detection algorithms and modulation orders according to an embodiment of the present disclosure.

For example, FIG. 4 is a graph illustrating simulated Frame Error Rate (FER) performance of calculating LLRs according to an embodiment of the present disclosure, and FIG. 5 is a table comparing detection algorithms and modulation orders in terms of FER performance. The simulation is performed by comparing a detection algorithm of selecting candidate symbol vectors and calculating the LLRs of the candidate symbol vectors according to the embodiment of the present disclosure with MLD, LSD, and QRD-M algorithms in terms of FER performance in a Convolutional Turbo Code (CTC)-concatenated spatial multiplexing system.

The following parameters are used in the simulation:
number of Tx antennas: 4
number of Rx antennas: 4
modulation scheme: QPSK, 16QAM, and 64QAM
information frame length: 480 bits
coding rate: ⅓
decoding scheme: Max-log Maximum A posteriori Probability (MAP) and scaling factor 0.7
each element of a channel matrix is an i.i.d. complex Gaussian probability variable with mean zero and variance one.

Referring to FIGS. 4 and 5, performance degradation 402, performance degradation 404, and performance degradation 406 are within 0.5 dB in the detection algorithm according to various embodiments of the present disclosure, in comparison to the MLD algorithm, in a multiple antenna system using coded spatial multiplexing with 4 Tx antennas and 4 Rx antennas. In particular, as a modulation order increases, the performance degradation 402, the performance degradation 404, and the performance degradation 406 are decreased in the proposed detection algorithm. For example, the detection algorithm according to various embodiments of the present disclosure achieves the same performance with far lower complexity than the LSD and QRD-M algorithms.

Figure 6:
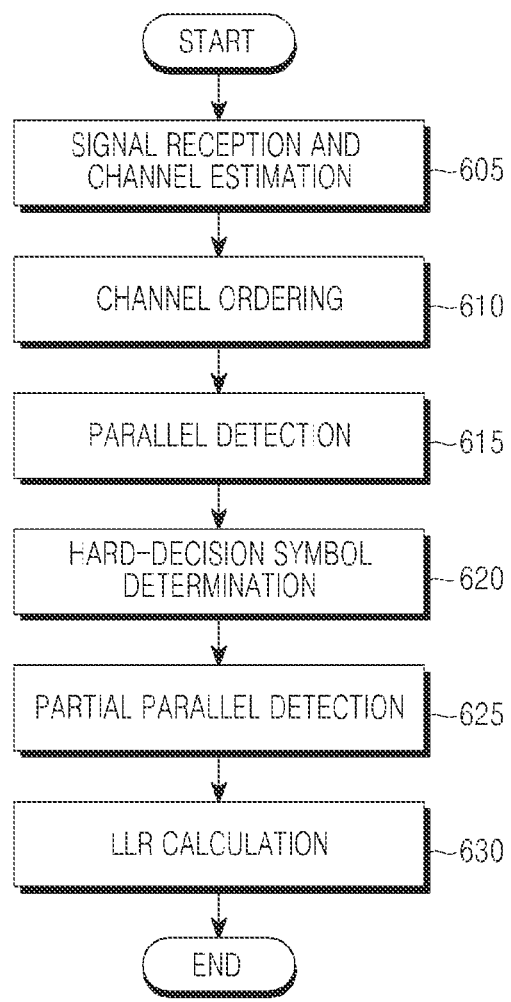
FIG. 6 is a flowchart illustrating a Log Likelihood Ratio (LLR) detection operation according to an embodiment of the present disclosure.

FIG. 6 is a flowchart illustrating an LLR detection operation according to an embodiment of the present disclosure.

Referring to FIG. 6, at operation 605, a receiver receives a signal and estimates a channel. For example, at operation 605, the receiver constructs (e.g., generates) a received signal vector with signals received through a plurality of Rx antennas and estimates a channel matrix using the received signal vector.

At operation 610, the receiver orders the column vectors of the channel matrix in a predetermined criterion.

At operation 615, the receiver determines Q candidate symbol vectors for the last ($N^{th}$) transmission symbol corresponding to the last column vector of the ordered channel matrix by performing parallel detection on the received signal vector and the ordered channel matrix. The predetermined criterion may be determined according to a detection algorithm used for the parallel detection. For example, the column vectors of the channel matrix may be ordered in order of better channel quality.

At operation 620, the receiver determines a candidate symbol vector having the shortest Euclidean distance to the received signal vector from among the Q candidate symbol vectors as an approximate ML symbol vector $s^{app}$ being a hard-decision value.

At operation 625, the receiver re-orders the channel matrix in such a manner that an $i^{th}$ column (i=1, . . . , N−1) is exchanged with the rightmost $N^{th}$ column, orders the columns other than the $N^{th}$ column of the re-ordered channel matrix (i.e., the original $i^{th}$ column) in a predetermined criterion, and performs parallel detection on the received signal vector using the ordered channel matrix. The predetermined criterion may be, for example, the same as used at operation 610. Herein, the remaining (N−1) transmission symbols except for an $i^{th}$ symbol $s_i^{app}$ of the approximate ML symbol vector $s^{app}$ are subject to partial parallel detection at operation 620. As a result, (Q−1) candidate symbol vectors are output for each of the remaining (N−1) transmission symbols.

At operation 630, the receiver calculates the LLRs of code symbols $b_{i,1}, \ldots, b_{i,Mc}$ corresponding to each $i^{th}$ transmission symbol using the Euclidean distances of the Q candidate symbol vectors acquired by parallel detection at operation 615 and the Euclidean distances of (N*Q−N−Q−1) candidate symbol vectors acquired by partial parallel detection at operation 625. The LLRs are soft-decision values and provided to a channel decoder.

Figure 7:
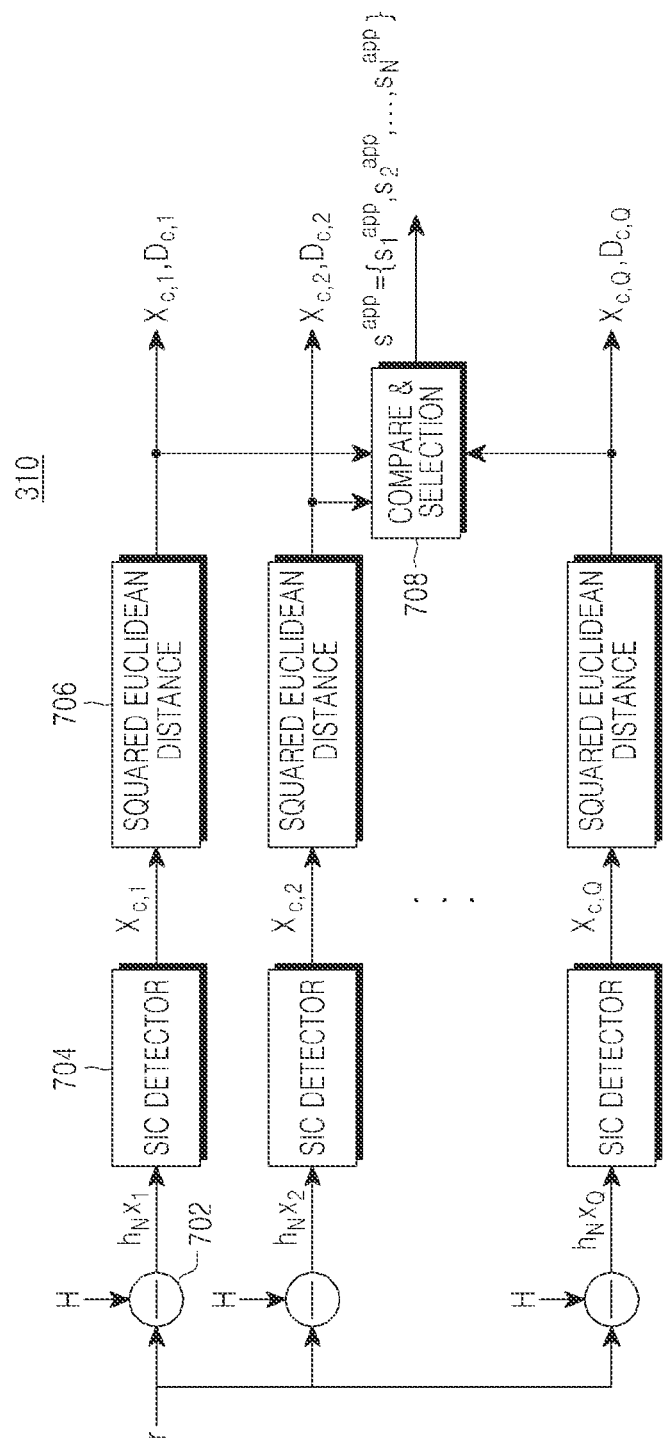
FIG. 7 is a detailed block diagram of a parallel detector according to an embodiment of the present disclosure.

FIG. 7 is a detailed block diagram of a parallel detector according to an embodiment of the present disclosure.

Referring to FIG. 7, the parallel detector 310 includes Q subtractors 702, Q Successive Interference Cancellation (SIC) detectors 704, Q squared Euclidean distance calculators 706, and a comparator/selector 708. Q may be an integer and may represent a modulation order. In order to detect the last transmission symbol vector $s_N$, the Q subtractors 702 respectively receive the products between a column vector $h_N$ corresponding to the last transmission symbol vector $s_N$ of the channel matrix H and all possible Q modulation symbols $x_1$, $x_2, \ldots x_Q$ from multipliers (not shown), subtract the products from a received signal r, and output the differences to the respective Q SIC detectors 704.

The Q SIC detectors 704 respectively detect candidate symbol vectors $X_{c,1}, X_{c,2}, \ldots, X_{c,Q}$ by performing an SIC algorithm on the received differences. Each of the Q squared Euclidean distance calculators 706 calculates a squared Euclidean distance between an input candidate symbol vector and the received signal r.

The comparator/selector 708 compares the Euclidean distances of the Q candidate symbol vectors and determines a candidate symbol vector $X_{c,i}$ having the shortest Euclidean distance as an approximate ML symbol vector $s^{app}$. $s^{app}=[s_1^{app}, s_2^{app}, \ldots, s_N^{app}]^T$ is provided to (N−1) partial parallel detectors.

Figure 8A:
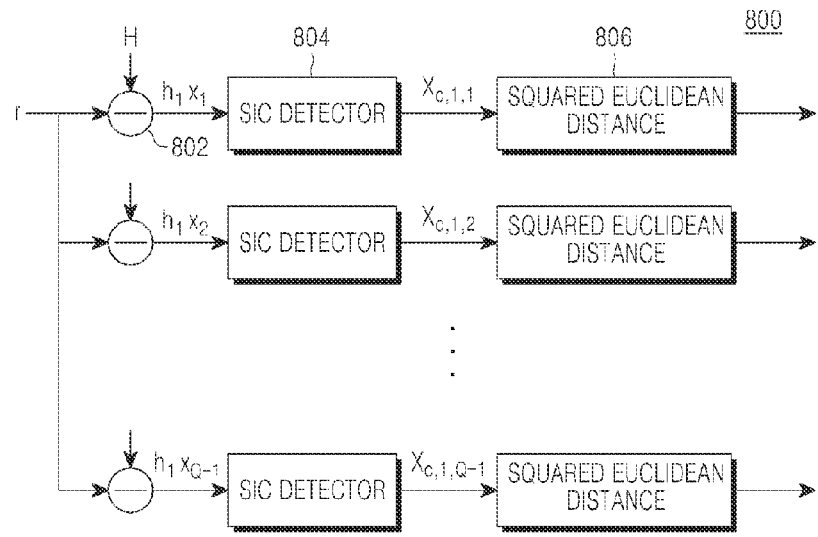
FIGS. 8A, 8B, and 8C are block diagrams of partial parallel detectors according to an embodiment of the present disclosure.
Figure 8B:
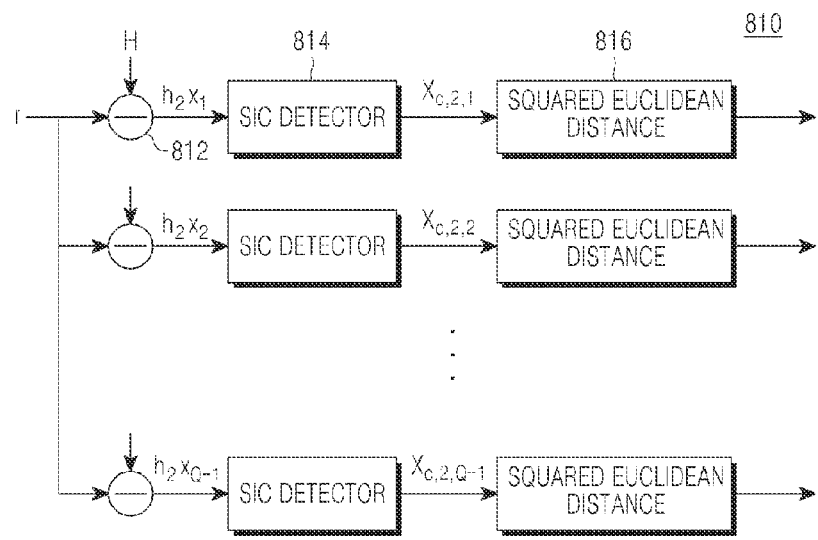
Figure 8C:
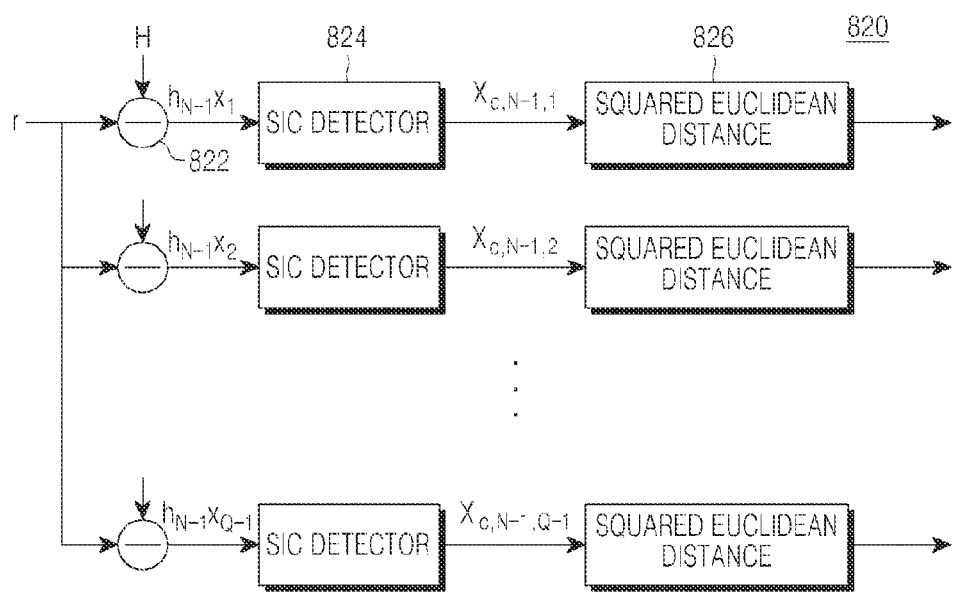

FIGS. 8A, 8B, and 8C are block diagrams of partial parallel detectors according to an embodiment of the present disclosure.

Referring to FIGS. 8A, 8B, and 8C, each of partial parallel detector 800, partial parallel detector 810, and partial parallel detector 820 includes a subtractor, an SIC detector, and a squared Euclidean distance calculator. For example, partial parallel detector 810 includes (Q−1) subtractors 802, (Q−1) SIC detectors 804 (Q−1), and (Q−1) squared Euclidean distance calculators 806. Similarly, partial parallel detector 820 includes (Q−1) subtractors 812, (Q−1) SIC detectors 814, and (Q−1) squared Euclidean distance calculators 816. As another example, partial parallel detector 820 includes (Q−1) subtractors 822, (Q−1) SIC detectors 824, and (Q−1) squared Euclidean distance calculators 826.

The channel matrix H is re-ordered in such a manner that an $i^{th}$ column (i=1, 2, ..., N−1) is exchanged with an $N^{th}$ column and the re-ordered channel matrix is input to the partial parallel detectors 800, 810, and 820.

Referring to FIG. 8A, the (Q−1) subtractors 802 respectively receive the products between a column vector $h_1$ corresponding to a first transmission symbol vector $s_1$ in a channel matrix H re-ordered so that a first column is exchanged with an $N^{th}$ column and (Q−1) modulation symbols $x_1, x_2, \ldots x_{Q-1}$ from multipliers (not shown), subtract the products from a received signal r, and provide the differences to the SIC detectors 804. Herein, (Q−1) modulation symbols except for a first symbol $s_1^{app}$ of $s^{app}$ are used from among all possible Q modulation symbols that are produced in the modulation scheme used in the transmitter.

The (Q−1) SIC detectors 804 respectively detect candidate symbol vectors $X_{c,1,1}, X_{c,1,2}, \ldots, X_{c,1,Q-1}$ by performing an SIC algorithm on the received differences.

Each of the (Q−1) squared Euclidean distance calculators 806 calculates a squared Euclidean distance $D_{c,1,i}$ between an input candidate symbol vector and the received signal r, and outputs the squared Euclidean distance $D_{c,1,i}$ together with the input candidate symbol vector.

Referring to FIG. 8B, the (Q−1) subtractors 812 respectively receive the products between a column vector $h_2$ corresponding to a second transmission symbol vector $s_2$ in a channel matrix H re-ordered so that a second column is exchanged with an $N^{th}$ column and (Q−1) modulation symbols $x_1, x_2, \ldots x_{Q-1}$ from the multipliers, subtract the products from the received signal r, and provide the differences to the SIC detectors 814. Herein, (Q−1) modulation symbols except for a second symbol $s_2^{app}$ of $s^{app}$ are used from among all possible Q modulation symbols that are produced in the modulation scheme used in the transmitter.

The (Q−1) SIC detectors 814 respectively detect candidate symbol vectors $X_{c,2,1}, X_{c,2,2}, \ldots, X_{c,2,Q-1}$ by performing the SIC algorithm on the received differences.

Each of the (Q−1) squared Euclidean distance calculators 816 calculates a squared Euclidean distance $D_{c,2,i}$ between an input candidate symbol vector and the received signal r, and outputs the squared Euclidean distance $D_{c,2,i}$ together with the input candidate symbol vector.

Referring to FIG. 8C, the (Q−1) subtractors 822 respectively receive the products between a column vector $h_{N-1}$ corresponding to an $(N-1)^{th}$ transmission symbol vector $s_{N-1}$ in a channel matrix H re-ordered so that an $(N-1)^{th}$ column is exchanged with an $N^{th}$ column and (Q−1) modulation symbols $x_1, x_2, \ldots x_{Q-1}$ from the multipliers, subtract the products from the received signal r, and provide the differences to the SIC detectors 824. Herein, (Q−1) modulation symbols except for an $(N-1)^{th}$ symbol $s_{N-1}^{app}$ of $s^{app}$ are used from among all possible Q modulation symbols that are produced in the modulation scheme used in the transmitter.

The (Q−1) SIC detectors 824 respectively detect candidate symbol vectors $X_{c,N-1,1}, X_{c,N-1,2}, \ldots, X_{c,N-1,Q-1}$ by performing the SIC algorithm on the received differences.

Each of the (Q−1) squared Euclidean distance calculators 826 calculates a squared Euclidean distance $D_{c,N-1,i}$ between an input candidate symbol vector and the received signal r, and outputs the squared Euclidean distance $D_{c,N-1,i}$ together with the input candidate symbol vector.

The candidate symbol vector detected in the parallel detector of FIG. 7 and the (N*Q−N−Q−1) candidate symbol vectors and squared Euclidean distances detected in the partial parallel detectors of FIGS. 8A, 8B, and 8C are used in calculating the LLR of each bit.

The proposed method and apparatus for generating soft-decision information in a multiple antenna system may be implemented as computer-readable code in a non-transitory computer-readable recording medium. The non-transitory computer-readable recording medium may include any kind of recording device storing computer-readable data. Examples of the non-transitory computer-readable recording medium may include Read Only Memory (ROM), Random Access Memory (RAM), optical disk, magnetic tape, floppy disk, hard disk, non-volatile memory, and the like, and may also include the medium that is implemented in the form of carrier waves (e.g., transmission over the Internet). In addition, the non-transitory computer-readable recording medium may be distributed over the computer systems connected over the network, and computer-readable codes may be stored and executed in a distributed manner.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for generating soft-decision information in a multiple antenna system, the method comprising:
   determining Q candidate symbol vectors for a first transmission symbol of a received signal vector by performing parallel detection on the received signal vector and a channel matrix;
   determining a candidate symbol vector having a shortest Euclidean distance to the received signal vector from among the Q candidate symbol vectors, as an approximate Maximum Likelihood (ML) symbol vector;
   determining (Q−1) candidate symbol vectors for each of the remaining transmission symbols of the received signal vector by performing partial parallel detection on the received signal vector and the channel matrix using the approximate ML symbol vector; and
   calculating Log Likelihood Ratios (LLRs) of bits of the first transmission symbol using the (Q−1) candidate symbol vectors,
   wherein Q represents a modulation order.

2. The method of claim 1, wherein the determining of Q candidate symbol vectors comprises:
   multiplying a last $N^{th}$ column vector of the channel matrix by all possible Q modulation symbols produced with the modulation order, and outputting products corresponding to the multiplying;

subtracting the products from the received signal vector, and outputting differences corresponding to the subtracting; and determining each of the Q candidate symbol vectors by performing a predetermined detection algorithm using the differences, wherein N represents a number of transmission antennas.

3. The method of claim 2, further comprising:
ordering column vectors of the channel matrix according to a predetermined criterion.

4. The method of claim 1, wherein the determining of (Q−1) candidate symbol vectors comprises:

re-ordering the channel matrix by exchanging an $i^{th}$ column vector of the channel matrix with a last $N^{th}$ column vector of the channel matrix;

multiplying an $i^{th}$ column vector of the re-ordered channel matrix by (Q−1) modulation symbols except for an $i^{th}$ symbol of the approximate ML symbol vector from among all possible Q modulation symbols produced with the modulation order, and outputting products corresponding to the multiplying;

subtracting the products from the received signal vector and outputting differences corresponding to the subtracting; and determining (Q−1) candidate symbol vectors for an $i^{th}$ transmission symbol by performing a predetermined detection algorithm using the differences, wherein N represents a number of transmission antennas and i represents an integer from 1 to N−1.

5. The method of claim 4, further comprising:
ordering the remaining column vectors except for the $N^{th}$ column vector of the channel matrix according to a predetermined criterion.

6. An apparatus for generating soft-decision information in a multiple antenna system, the apparatus comprising:

a parallel detector configured to determine Q candidate symbol vectors for a first transmission symbol of a received signal vector by performing parallel detection on the received signal vector and a channel matrix, and to determine a candidate symbol vector having a shortest Euclidean distance to the received signal vector from among the Q candidate symbol vectors, as an approximate Maximum Likelihood (ML) symbol vector;

a plurality of partial parallel detectors configured to determine (Q−1) candidate symbol vectors for each of the remaining transmission symbols of the received signal vector by performing partial parallel detection on the received signal vector and the channel matrix using the approximate ML symbol vector; and a calculator configured to calculate Log Likelihood Ratios (LLRs) of bits of the first transmission symbol using the (Q−1) candidate symbol vectors, wherein Q represents a modulation order.

7. The apparatus of claim 6, wherein the parallel detector comprises:

multipliers configured to multiply a last $N^{th}$ column vector of the channel matrix by all possible Q modulation symbols produced with the modulation order, and to output products corresponding to the multiplying;

subtractors configured to subtract the products from the received signal vector, and to output differences corresponding to the subtracting; and detectors configured to determine each of the Q candidate symbol vectors by performing a predetermined detection algorithm using the differences, wherein N represents a number of transmission antennas.

8. The apparatus of claim 7, wherein column vectors of the channel matrix are ordered according to a predetermined criterion.

9. The apparatus of claim 6, wherein each of the partial parallel detectors comprises:

multipliers configured to multiply an $i^{th}$ column vector of a channel matrix acquired by reordering the channel matrix by exchanging an $i^{th}$ column vector of the channel matrix with a last $N^{th}$ column vector of the channel matrix by (Q−1) modulation symbols except for an $i^{th}$ symbol of the approximate ML symbol vector from among all possible Q modulation symbols produced with the modulation order and to output products corresponding to the multiplying;

subtractors configured to subtract the products from the received signal vector and to output differences corresponding to the subtracting; and detectors configured to determine (Q−1) candidate symbol vectors for an $i^{th}$ transmission symbol by performing a predetermined detection algorithm using the differences, wherein N represents a number of transmission antennas and i represents an integer from 1 to N−1.

10. The apparatus of claim 9, wherein the remaining column vectors except for the $N^{th}$ column vector of the channel matrix are ordered according to a predetermined criterion.

11. A non-transitory computer-readable storage medium storing instructions that, when executed, cause at least one processor to perform the method of claim 1.

12. An electronic device comprising the apparatus of claim 6.

13. A base station comprising the apparatus of claim 6.

14. A portable terminal comprising the apparatus of claim 6.

* * * * *